United States Patent [19]
Rekuc

[11] Patent Number: 5,177,837
[45] Date of Patent: Jan. 12, 1993

[54] STRAP ATTACHMENT FOR LUGGAGE AND THE LIKE

[75] Inventor: Richard J. Rekuc, Pattenburg, N.J.

[73] Assignee: Royalox International Inc., Phillipsburg, N.J.

[21] Appl. No.: 830,124

[22] Filed: Jan. 31, 1992

[51] Int. Cl.⁵ .............................................. A44B 11/00
[52] U.S. Cl. ........................................ 24/198; 24/200; 24/599.1
[58] Field of Search ................. 24/198, 169, 176, 186, 24/170, 171, 191, 194, 200, 601.5, 599.1; 297/486; 450/86; 2/322, 328

[56] References Cited

U.S. PATENT DOCUMENTS

| 406,188 | 7/1889 | Andress | 24/599.1 |
|---|---|---|---|
| 628,619 | 7/1899 | Alwood | 24/599.1 |
| 686,982 | 11/1901 | Malins | 24/191 |
| 913,469 | 2/1909 | Cleaveland | 24/170 |
| 2,099,199 | 11/1937 | Devendor et al. | 24/198 |
| 2,212,862 | 8/1940 | Hirsh | 24/198 |
| 2,872,717 | 2/1959 | Kelley | 24/599.1 |
| 3,887,966 | 6/1975 | Gley | 24/200 |

FOREIGN PATENT DOCUMENTS

| 1358345 | 3/1964 | France | 24/601.5 |
|---|---|---|---|
| 0937459 | 9/1963 | United Kingdom | 24/601.5 |

Primary Examiner—Victor N. Sakran
Attorney, Agent, or Firm—Herbert Dubno

[57] ABSTRACT

A buckle affixed to an article of luggage forms a webbing clip over a bar of which a loop of a shoulder strap can be inserted past a detent which can be manipulated by the user to allow the web loop to be removed. This arrangement eliminates any metal object at the end of the shoulder strap which may cause injury as this end swings about.

19 Claims, 4 Drawing Sheets

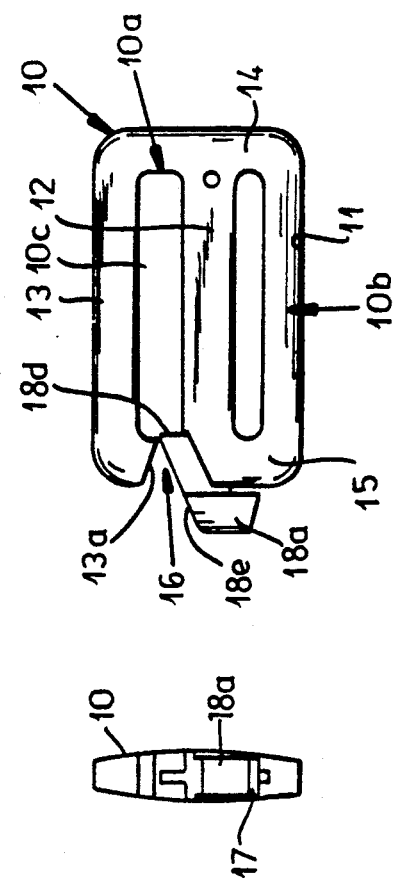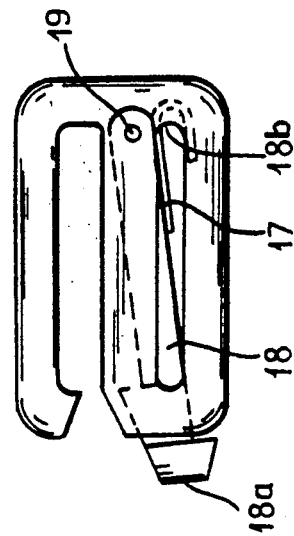

STRAP ATTACHMENT FOR LUGGAGE AND THE LIKE

FIELD OF THE INVENTION

My present invention relates to a strap attachment for luggage and the like and, more particularly, to a buckle which cooperates with a webbing loop to enable the releasable connection of the webbing loop to the buckle.

BACKGROUND OF THE INVENTION

The use of shoulder strips on luggage is widespread. Generally such shoulder straps must be removably connected to the article so that they can be detached from the article, for example, for air travel and whenever the luggage is to be placed upon a conveyor or the like. For that purpose, it has been the practice to provide at the end of the strap, a metal clip which can be actuated by the user to engage in a D-ring or the like attached to the article of luggage by a fabric loop. This system has the significant drawback that the clip has a tendency to break when subjected to excessive stress, may wear excessively at an eye of the clip where it slidingly engages the D-ring, especially if the clip is made of a material other than that of the D-ring, and upon breakage may present a sharp-edged fracture portion which can be dangerous to the user.

In fact, in the removal of such straps, the clip end frequently swings upwardly into the face of the user or a bystander and, in many instances, upon rupture of the clip, a similar accident can occur. Every year there are cases in which a user or bystander is injured, e.g. blinded, by the free end of the strap and the intact or broken clip.

OBJECTS OF THE INVENTION

It is, therefore, the principal object of the present invention to provide an improved attachment device for the removable attachment of a shoulder strap or the like to an article of luggage or the like whereby the aforementioned drawbacks are avoided.

It is another object of my invention to provide a buckle for such attachment which can be easily manipulated for the removal or reattachment of a shoulder strap to an article of luggage but wherein the danger of accident or injury from a metal object at the end of the strap can be greatly reduced.

A still further object of this invention is to provide a clip-type device which affords greater strength and reliability against breakage so that free flying broken parts of an attachment are not likely to endanger the user or a bystander.

SUMMARY OF THE INVENTION

These objects and others which will become apparent hereinafter are attained, in accordance with the invention, in a webbing clip, buckle or attachment for securing a shoulder strap or other web of flexible material to an article of luggage or some other article to which the clip or buckle has previously been affixed, wherein the clip comprises a bar onto which a loop of the web can be shifted and a spring-loaded detent which is deflected by the loop as it is fitted over the bar and engages behind the loop to retain it on the bar until the detent is manually retracted or deflected to permit the loop to be withdrawn.

Since the strap is formed at its end or at each end with only a fabric or leather loop and all of the metal components of the attachment are retained on the article, the danger of injury to the user or a bystander from a metal connector on the strip is eliminated. Furthermore, since the bar forms part of the device retained on the article in a preferred embodiment of the invention and the clip can have a strength significantly greater than the snap catches used heretofore, there is little danger that the clip itself will rupture. However, should the clip break, any break will occur preferentially between the bar and the remainder of the clip so that the bar will not be retained on the web to form a dangerous or injurious instrumentality.

More particularly, the buckle of the invention for detachably securing a shoulder strip or the like to a luggage article or the like comprises:

a buckle body having a first bar receivable in a web loop for securing the body of an article, the body having a second bar generally parallel to the first bar and anchored to the first bar at one end of the second bar, another end of the second bar defining a mouth enabling another web loop to be fitted over the second bar and the web thereof inserted through the mouth over the second bar, a detent on the body juxtaposed with the other end of the second bar, deflectable by the web upon insertion of the other loop over the second bar and impeding involuntary withdrawal of the web through the mouth;

spring means acting on the detent to bias same toward the other end of the second bar; and means on the body operable by a user to draw the detent away from the other end of the second bar and enable removal of the other web loop from the body.

According to a feature of the invention, the body is formed with a central bar parallel to the first and second bars but spaced therefrom, the central bar defining respective frame portions with the first and second bars. The detent can be a lever swingable on the central bar.

According to a feature of the invention, the lever can be pivotally connected to the body at an end of the lever remote from the mouth by a respective pivot.

Various spring constructions can be used in accordance with the invention. For example, the spring means can include a torsion spring acting on the lever and extending around the pivot, or a compression spring bearing upon the lever.

To ensure retention of the web loop on its bar, the lever can be formed with a barb defining the mouth or adjacent the mouth. The lever and the other end of the second bar can have mutually inwardly converging inclined edges defining the mouth.

The means on the detent engageable by the user can be a handle on a free end of the lever projecting beyond the body. The lever can have opposite ends each juxtaposed with a respective end of one of the bar, whereby each of the loops can be insertable over a respective one of the bars past a respective detent and can be removable. In the more common case, however, the first loop will represent a permanent attachment of the buckle to the luggage article.

According to a feature of the invention, the detent can be a toggle swingable on the body and in its normal position, blocking the withdrawal of a web, can engage an outer bar by gripping over a projection thereof so that the detent or toggle can have a dual function. It serves to block withdrawal of the web on the one hand and, on the other hand, forms a bridge between the outer bar and the central bar, resisting breakage of the outer bar and the buckle when substantial stress is applied to the web, for example.

According to a feature of the invention, the actuator for the detent in this case is a slide accommodated in a chamber of the central bar and linearly shiftable therein, an end of the slide having a finger which is adapted to engage a finger of the detent lever. The actuator may be biased into its normal position by a compression spring received in a slot of the actuator and braced against a pin anchored to the body and passing through that slot. The detent lever may, in turn, be pivotable about another pin and can be swung about this latter pin by a torsion spring or the like.

While the invention has been described specifically as part of a shoulder strap attachment system for luggage, it will be understood that it may have application elsewhere, for example wherever two strap ends must be joined.

BRIEF DESCRIPTION OF THE DRAWING

The above and other objects, features and advantages of the present invention will become more readily apparent from the following description, reference being made to the accompanying drawing in which:

FIG. 1 is an elevational view of the buckle of the invention;

FIG. 2 is a front end view of the buckle;

FIG. 3 is a top view of the buckle;

FIG. 4 is a view similar to FIG. 1 showing the buckle in its open position, i.e. with the lever forming the detent deflected downwardly against the force of the spring;

FIG. 5 is a rear view of the buckle;

FIG. 6 is a bottom view of the buckle;

SPECIFIC DESCRIPTION

Figure 7:
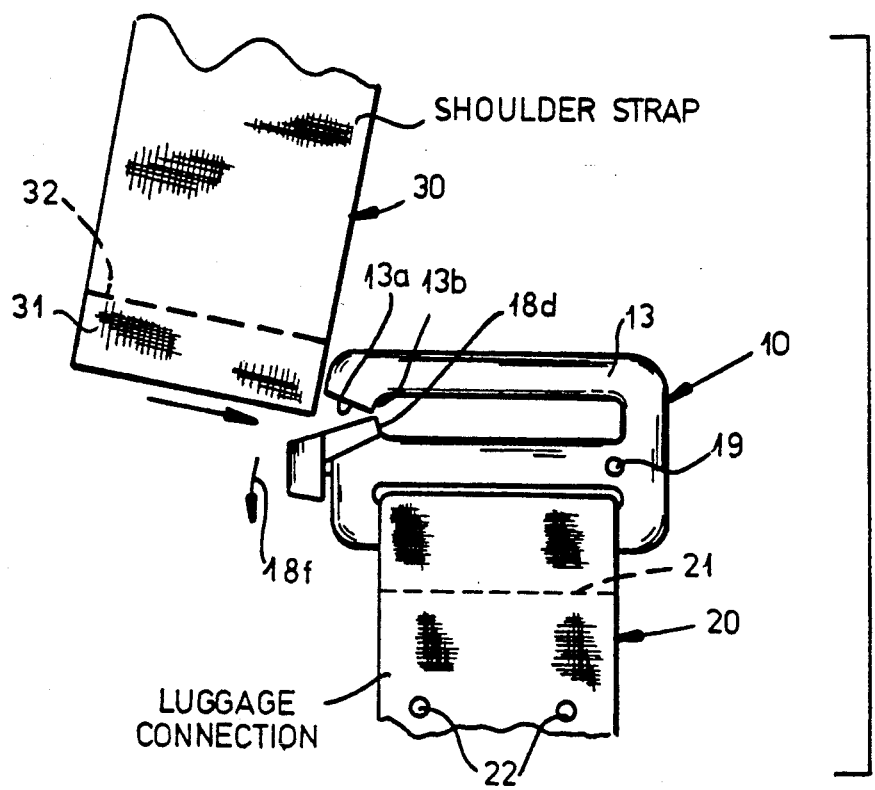
FIG. 7 is an elevational view showing the application of the shoulder strap to the buckle as attached to a luggage article.

As will be apparent from FIGS. 1-6, the buckle 10 comprises a lower bar 11, a central bar 12 and an upper bar 13, the bars being connected by a side piece 14 extending the full height of the buckle and a side piece 15 which is spaced from the upper bar 13 to form a mouth 16 therewith.

As will be apparent from FIG. 6, the lower bar 11 is of reduced thickness to enable a strap 20 of webbing to be looped thereover and sewn with a stitch row 21 to permanently anchor the buckle 10 to the strap 20 which is connected to an article of luggage by rivets 22 or the like.

Figure 8:
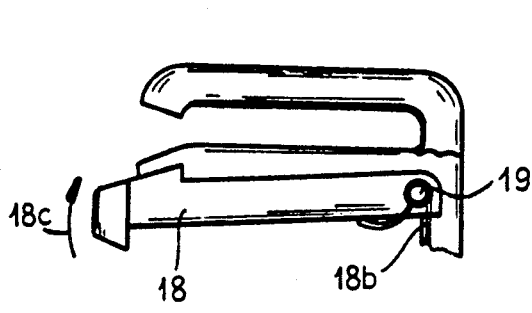
FIG. 8 is a fragmentary elevational view, partly broken away, showing a torsion spring arrangement acting upon the lever.

The buckle has a compartment 17 at least in the central bar 12 within which a lever bar 18 is pivotal about a pivot pin 19. The lever bar 18 has a handle 18a which projects beyond the frames 10a and 10b formed by the bars so that the user can swing the lever bar 18 into its open position as seen in FIG. 4. A spring 18b which can be the torsion spring shown in FIG. 8, can be provided to resiliently bias the bar in its clockwise sense as represented by the arrow 18c into its closed position shown in FIG. 1. In this position, a barb 18d projects into the path of any loop which can surround the bar 13. The bar 13 has a surface 13a inclined to the surface 18e of the detent formed by the lever bar 18 so that a loop can be guided between these inclined surfaces into the spaces 10c of the frame 10a.

This is shown in FIG. 7 in diagrammatic form. In this Figure, a shoulder strap 30 is illustrated and has a loop 31 formed at its end by a row 32 of stitching.

When this loop is fitted onto the bar 13, the detent 18 is deflected downwardly (arrow 18f), to allow the loop to clear and, once the loop has cleared, the barb 18d retains the loop on the bar 13 until the handle 18a is depressed to allow the loop to be drawn off the bar 13. The latter can have an inwardly projecting tooth 13b to facilitate the retention of the loop on this bar.

While a pivot pin 19 has been shown to form the pivot for the lever bar 18 it will be understood that other spring and pivot arrangements can be used. For example, the lever bar may be a spring tongue which is intrinsically resilient to form the spring means and can have a fixed end remote from the handle end anchored in or forming part of the body 10 of the clip. In general, however, a torsion or compression spring will be used. The torsion spring 18b, shown in FIG. 8, for example, surrounds the pivot pin 19.

Figure 9:
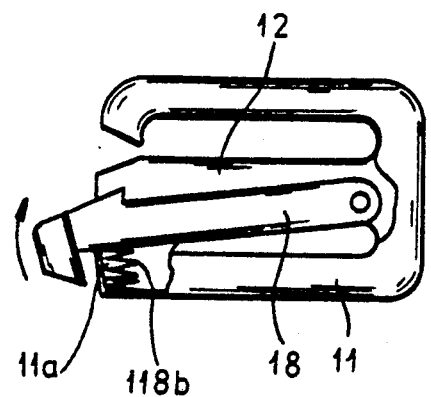
FIG. 9 is a view similar to FIG. 8 showing a compression spring acting upon the lever.

In the embodiment of FIG. 9, however, just as a bar 18 is located in a compartment 18a of the central bar 12, a compression spring 118b can be lodged in a compartment 11a of the bar 11 and can bear upon the lever bar 18 to urge it into its closed position.

Figure 10:
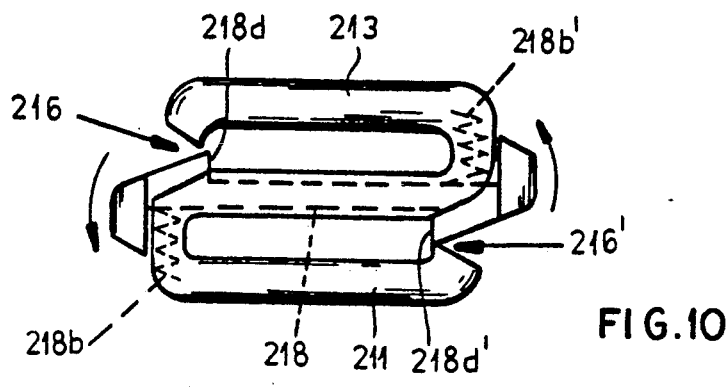
FIG. 10 is a view similar to FIG. 1 of an embodiment of the buckle according to the invention, in which the buckle is reversible and both loops can be retained removably by detents formed by a single swingable lever.

The embodiment of FIG. 10 allows two straps to be releasably connected to the buckle.

In this case, the bar 218 forms two detents 218d and 218d' at respective mouths 216 and 216' defined with the respective bars 211 and 213, respectively. Respective coil springs 218b and 218b' can be provided for the respective ends of the bar 218. In this embodiment, one loop may be inserted over bar 211 through the mouth 216' while another loop can be inserted over the bar 213 through the mouth 216 in the manner described.

The buckle 310 shown in FIGS. 11-16 comprises a lower bar 311, a central bar 312 and an upper bar 313, the bars being connected by a side piece 314 extending the full height of the buckle and a side piece 315 which is spaced from the upper bar 313 to form a mouth 316 therewith.

The lower bar can allow a strap 20 of webbing to be looped thereover and sewn and attached to an article of luggage as has been described in connection with FIGS. 1-6. The buckle has a compartment 317 in which an actuator 318 is linearly displaceable. The actuator 318 has a handle 318a which projects beyond the body of the buckle so that the user can push the actuator inwardly against the force of a compression spring 350. The compression spring is received in a slot 351 of the actuator and is braced at 352 against an end of this slot and against a pin 353 traversing the body of the buckle. Thus the spring 350 biases the actuator 318 to the left against the actuation force applied by the user. The slide or actuator 318 has a finger 354 which bears against a finger 355 of a separate detent lever 356 swingable about an axis defined by a pin 357 as represented by the arrow 358.

Figure 11:
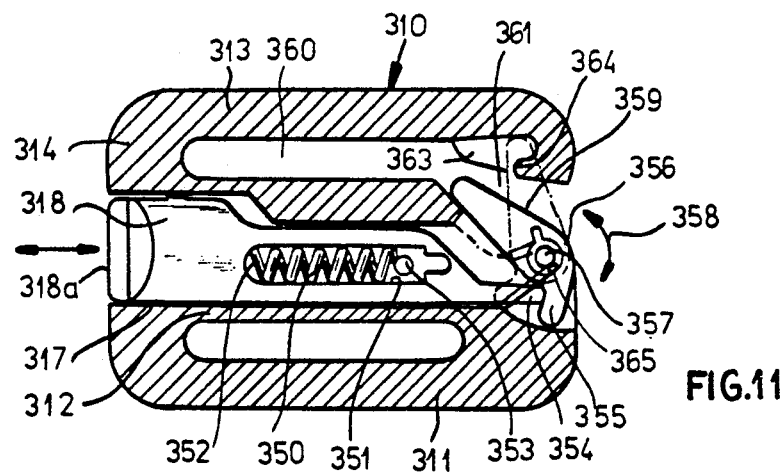
FIG. 11 is a cross sectional view through a buckle according to another embodiment of the invention showing the actuator for the detent pressed inwardly and the detent swung from its normal position into a position allowing a web loop to be withdrawn from the buckle.
Figures 12, 13, 14:
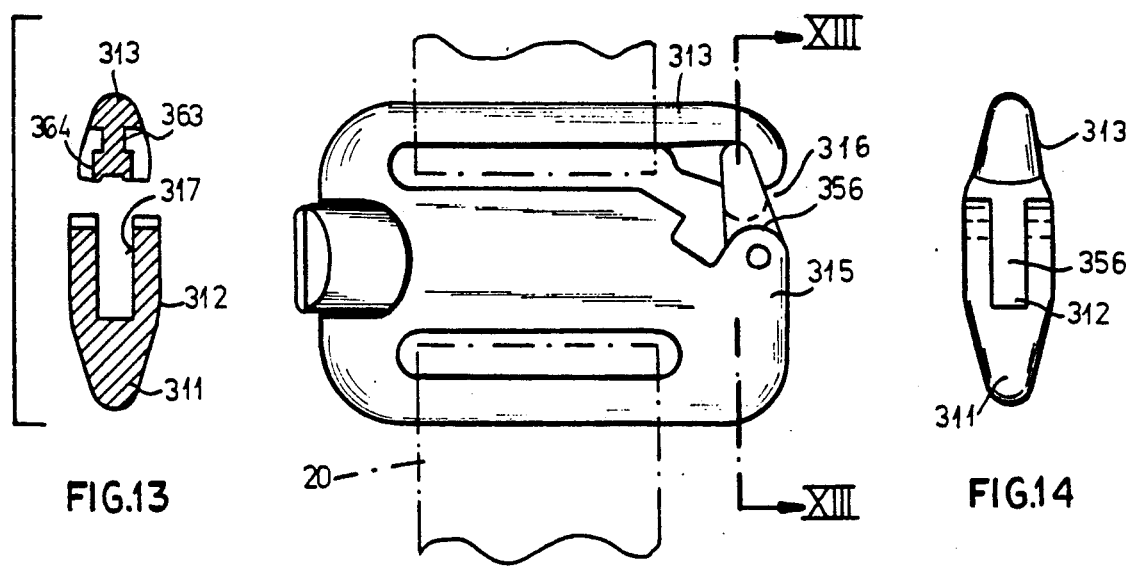
FIG. 12 is a side elevational view of this buckle showing web loops attached thereto in phantom lines.
FIG. 13 is a cross sectional view taken along the line XIII—XIII of FIG. 12 with the detent or toggle member removed.
FIG. 14 is an end view of the buckle with the detent or toggle in place.

The lever 356 in effect is a toggle swingable between its solid line position shown in FIG. 11, wherein its flank 359 serves as a ramp guiding the web into the slot 360 formed between the upper bar 313 and the central bar 312, in a position shown in dot-dash lines wherein its flank 361 forms an abutment preventing the web from being withdrawn from this slot.

Figures 15, 17:
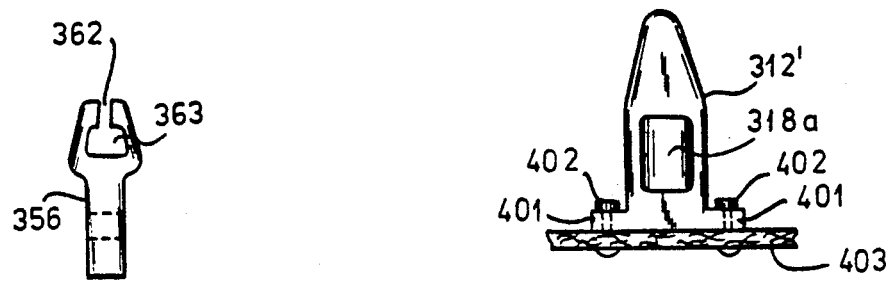
FIG. 15 is an elevational view of the detent.
FIG. 17 is a rear view of the buckle of FIGS. 11-16 in a modification of the invention wherein the buckle is attached directly to the article of luggage.
Figure 16:
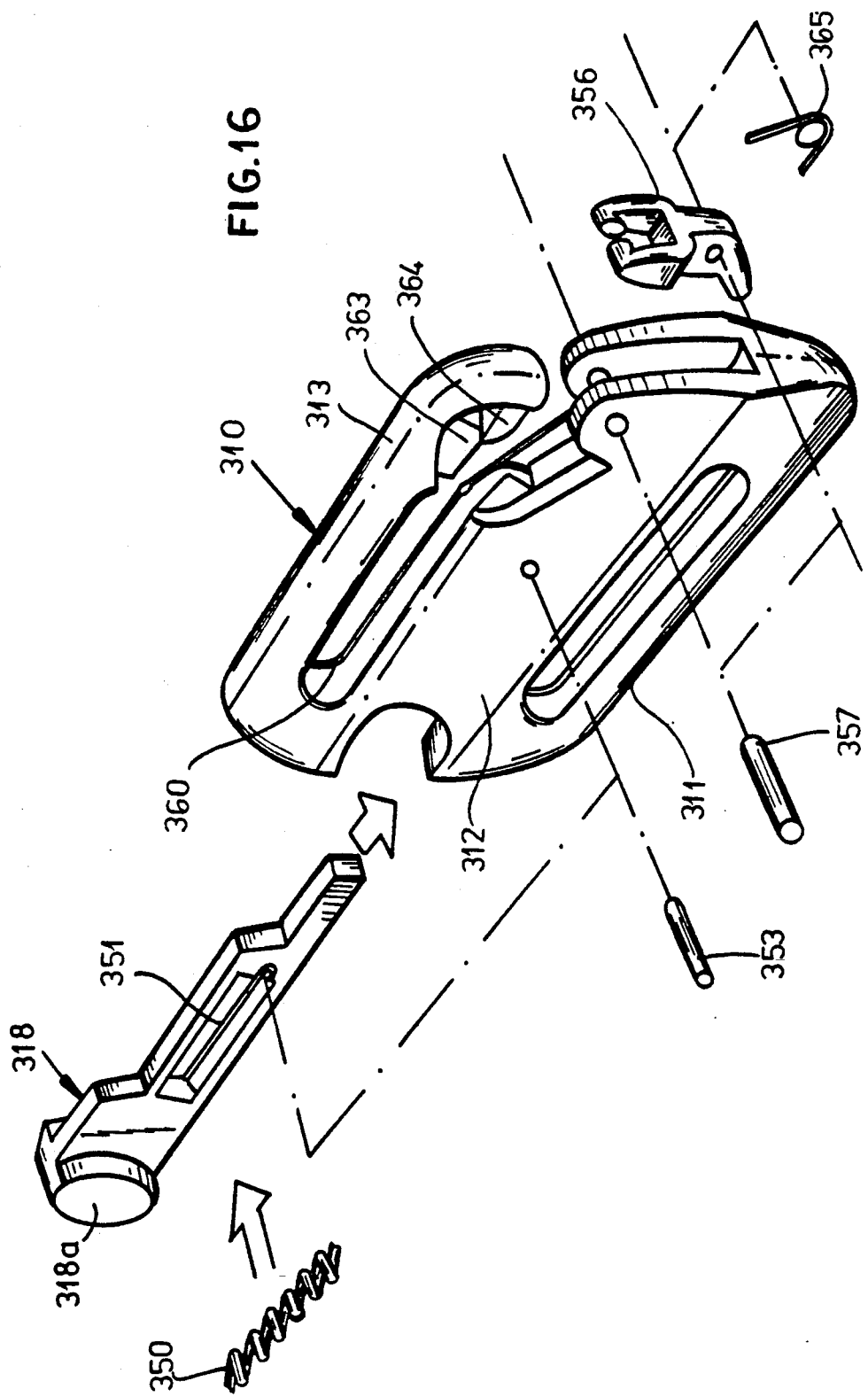
FIG. 16 is an exploded view of the latter buckle.

As can be seen from FIG. 15, the lever 356 is formed with a slot 362 through which a rib 363 can pass to provide lateral guidance for the detent, and an opening 363 adapted to engage a reentrant formation or projection 364 on the upper bar 313. In its normal position shown in dot-dash lines in FIG. 11, therefore, the detent 356 engages over the formation 364 relative to the side piece 314 and thereby stabilizes the buckle. The detent 356 is biased into this position by a torsion spring 365. It will be apparent, therefore, that until the slide or actuator 318 is depressed inwardly, the detent 356 will block the mouth 316 and hold the free end of the bar 313 to the remainder of the body against applied forces. However, once the actuator 318 is depressed, the detent will be swung from its solid line position of FIG. 12 to its solid line position of FIG. 11 to clear the web and enable its withdrawal.

As can be seen from FIG. 17, while the buckle generally will be attached by a web loop to the article of luggage in the manner described for the best mode embodiment of FIGS. 11-16, it is also possible to secure the buckle body directly to the article of luggage. In that case, the body 312' does not have a lower bar of the body 312 seen in FIG. 12, but is formed with a pair of lateral flanges 401 which are directly transfixed by rivets 402 passing through a wall 403 of the article of luggage. In that case, any direct mounting means can be used such as the rivets shown, screws, prongs, etc., thereby eliminating the webbing affixing the buckle onto the case.

I claim:

1. A buckle for detachably securing a strap to an article, comprising:
    a buckle body comprising a first longitudinally extending bar encirclable by a first web loop of a web forming a strap, a central bar parallel to said first bar and defining a first longitudinal slot therewith through which said web of said first web loop can pass, and a second bar parallel to said first and central bars, encirclable by a second web loop of a web securing said buckle to said article and defining a second longitudinal slot with said central bar parallel to said first slot, said web of said second loop passing through said second slot, said central bar being connected to said first and second bars at least at one end thereof to form respective generally rectangular frames with said first and second bars, at least one of said first and second bars at another end thereof defining with said central bar a mouth enabling a respective web of a respective web loop adapted to encircle same to be inserted into and removed from the respective slot through said mouth;
    a detent on said body juxtaposed with said other end of said one of said bars, deflectable by the web of the loop adapted to encircle same upon insertion of said loop over said one of said bars and impeding involuntary withdrawal of the inserted loop through said mouth;
    spring means acting on said detent to bias same toward said other end of said one of said bars; and
    means on said body operable by a user to draw said detent away from said other end of said bar and enable removal of the respective web loop from said one of said bars through said mouth.

2. The buckle defined in claim 1 wherein each of said first and second bars defines with said central bar a respective mouth through which the respective web loop can be inserted and a respective detent is provided to block withdrawal of the respective loops from said mouths, each of said detents cooperating with a respective means operable by the user to retract the respective detent from the respective mouth and enable removal of the respective web loop from the body.

3. The buckle defined in claim 1 said detent is a lever swingable on said central bar.

4. The buckle defined in claim 3 wherein said lever is pivotally connected to said body at an end of said lever remote from said mouth by a respective pivot.

5. The buckle defined in claim 4 wherein said spring means includes a torsion spring acting on said lever and extending around said pivot.

6. The buckle defined in claim 4 wherein said spring means includes a compression spring bearing on said lever.

7. The buckle defined in claim 4 wherein said lever is formed with a barb defining said mouth.

8. The buckle defined in claim 7 wherein said lever and said other end of said one of said bars have mutually inwardly converging inclined edges defining said mouth.

9. The buckle defined in claim 8 wherein said means on said body operable by said user is a handle on a free end of said lever projecting beyond said body.

10. The buckle defined in claim 3 wherein said lever has opposite ends each juxtaposed with a respective end of one of said first and second bars, whereby each of said loops is insertable over a respective one of said first and second bars past a respective detent.

11. The buckle defined in claim 3 wherein said lever is housed in a compartment in said central bar.

12. The buckle defined in claim 1 wherein said spring means includes a torsion spring acting on said detent.

13. The buckle defined in claim 1 wherein said spring means includes a compression spring acting upon said detent.

14. The buckle defined in claim 1 wherein said detent is formed with a barb defining said mouth.

15. The buckle defined in claim 1 wherein said detent and said other end of said one of said bars have mutually inwardly converging inclined edges defining said mouth.

16. The buckle defined in claim 1 wherein said means on said body has a handle projecting beyond said body.

17. A buckle for detachably securing a strap to a luggage article or the like, comprising:
    a buckle body having means for securing said body to an article, said body having a bar cantilevered from said body at one end of said bar, another end of said bar defining a mouth enabling a web loop to be fitted over said bar and a web thereof to be inserted through said mouth over said bar;
    a detent on said body juxtaposed with said other end of said bar, deflectable by said web upon insertion of said loop over said bar and impeding involuntary withdrawal of said web through said mouth;
    spring means acting on said detent to bias same toward said other end of said bar; and
    means on said body operable by a user to draw said detent away from said other end of said bar and enable removal of said web loop from said body, said detent being a toggle pivotally mounted on said body and swingable between a position enabling insertion of said loop over said bar and a position blocking involuntary withdrawal of said web through said mouth and in which said detent engages a projection of said bar.

18. The buckle defined in claim 17 wherein said means on said body operable by said user includes a slide actuator on said body engageable with said detent.

19. The buckle defined in claim 18, further comprising a compression spring in said actuator biasing same in a direction enabling said detent to swing into said position wherein said detent blocks withdrawal of said web through said mouth, said detent being provided with a torsion spring biasing same into the last-mentioned position.

* * * * *